Feb. 24, 1959 A. J. YOUNG 2,874,885
STATION WAGON RACK
Filed Dec. 29, 1955 3 Sheets-Sheet 1
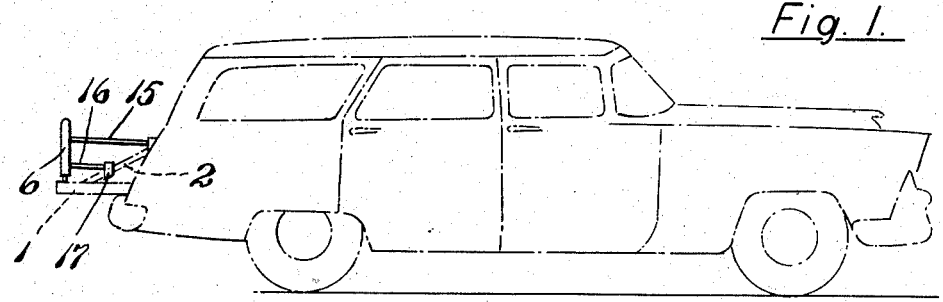
Fig. 1.
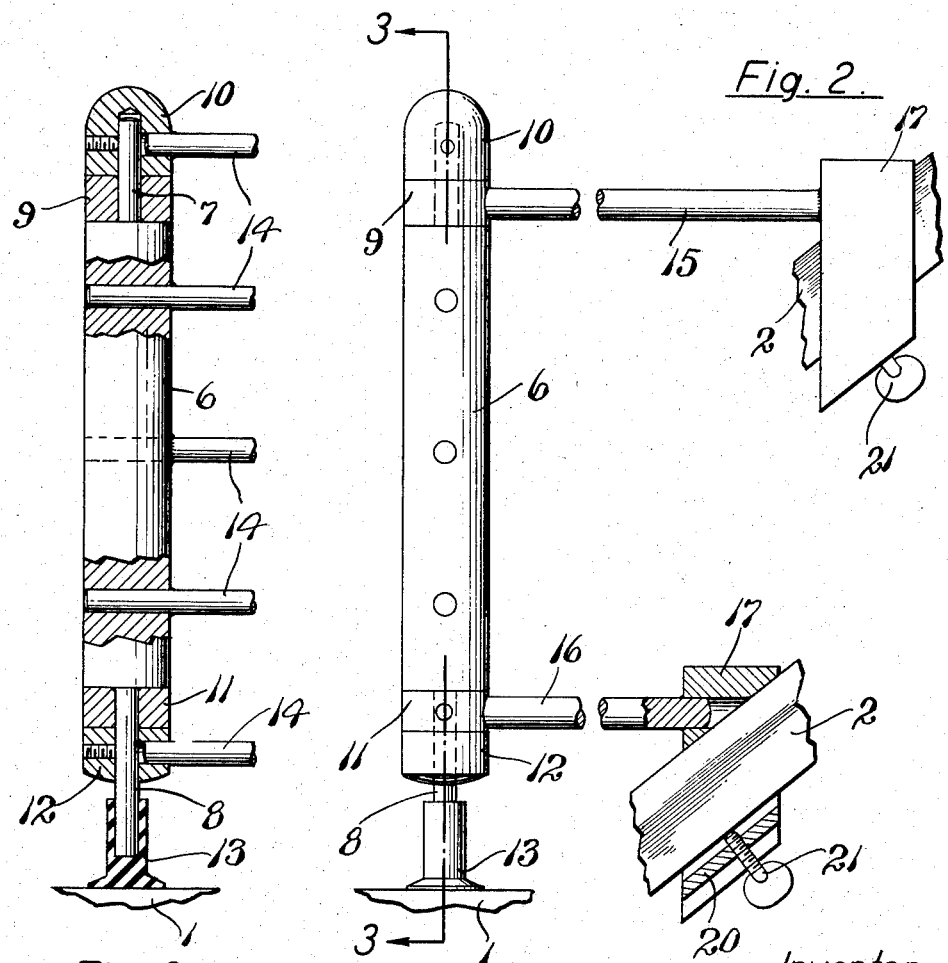
Fig. 2.
Fig. 3.
Inventor
Albert J. Young
By- Frank E. Liverance, Jr.
Attorney Feb. 24, 1959 A. J. YOUNG 2,874,885
STATION WAGON RACK
Filed Dec. 29, 1955 3 Sheets-Sheet 2
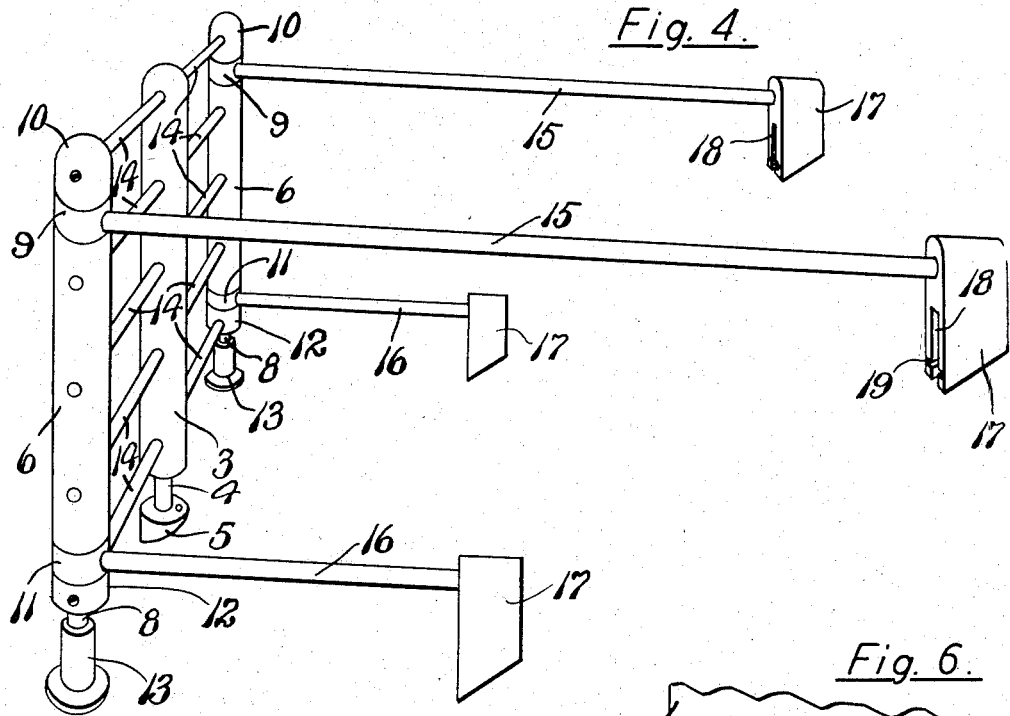
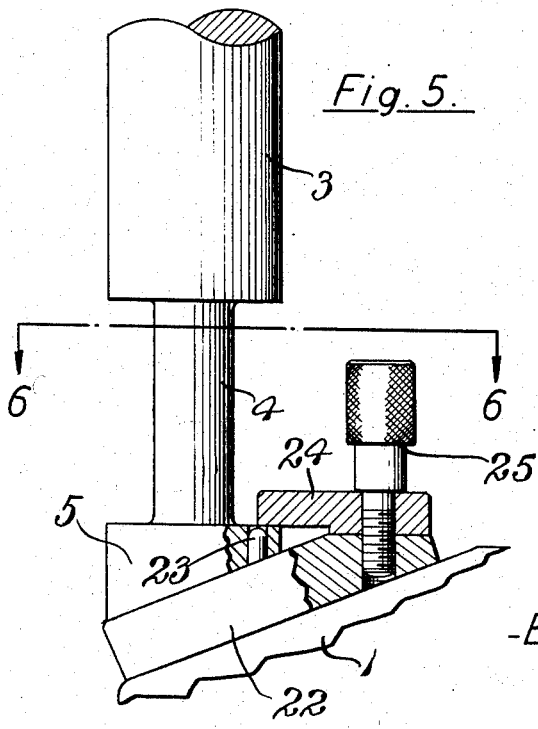
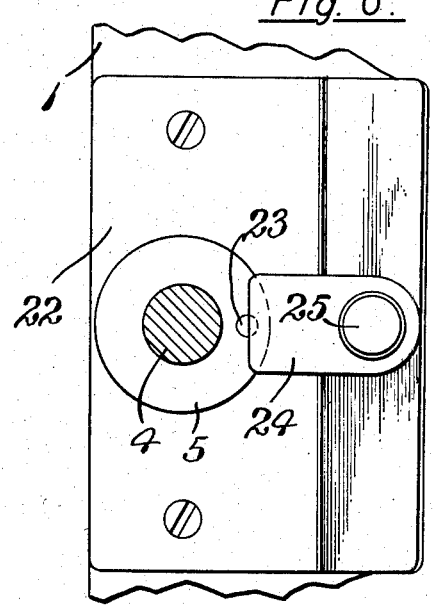
Inventor
Albert J. Young
By Frank E. Liverance, Jr
Attorney Feb. 24, 1959 A. J. YOUNG 2,874,885
STATION WAGON RACK
Filed Dec. 29, 1955 3 Sheets-Sheet 3
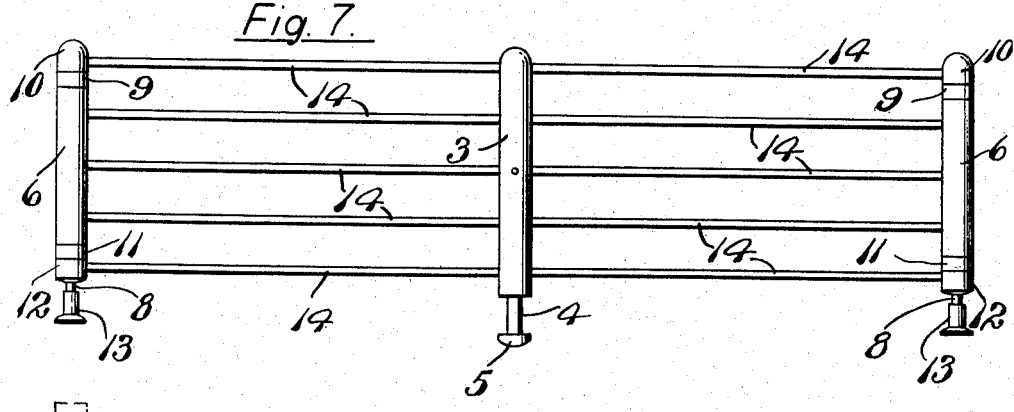
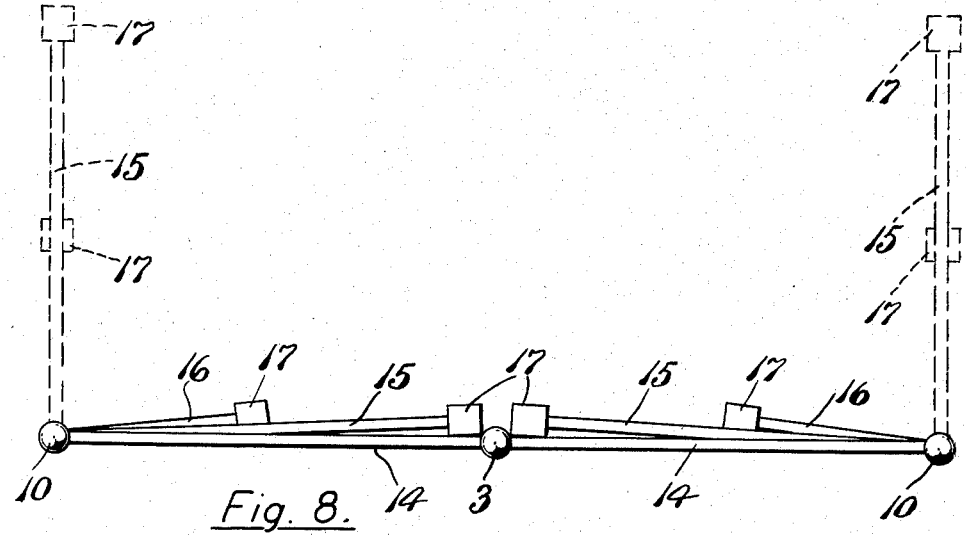
Inventor
Albert J. Young
By Frank E. Liverance, Jr.
Attorney

United States Patent Office 2,874,885
Patented Feb. 24, 1959

2,874,885

STATION WAGON RACK

Albert J. Young, Muskegon, Mich.

Application December 29, 1955, Serial No. 556,116

4 Claims. (Cl. 224—42.42)

The present invention relates to a practical, sturdy, economically built, novel rack which is easily connected and securely held at the rear end of a station wagon body of an automobile when the rear closure door is turned from its generally vertical closed position to a horizontal open position. With such door in horizontal position providing a bottom upon which luggage or other articles may be placed, the novel rack structures of my invention is easily secured in place by detachable attachment to the upwardly and inwardly extending diagonal braces which at their upper inner ends are pivotally connected to the sides of the station wagon body and at their outer ends have a pivotal connection adjacent each end of the door when it is in horizontal position, holding the door securely in such position. The rear member of the rack which extends vertically above the horizontal bottom provided by such open door is likewise detachably secured to such door at the upper side thereof adjacent its rear edge. There is thus provided a holding or surrounding rack enclosure for goods carried on such horizontal station wagon rear door, preventing movement off the same to the rear and such movement also being prevented from the door at its ends by means of the interposition of such braces and the connecting means releasably attached thereto by means of which the rack is fastened to the braces.

The invention which I have devised when not in use is collapsible to occupy small space. Also when secured in place for use, the rack and the goods within it carried by the rear door of the station wagon body may be easily covered by a waterproof fabric covering for protection of the goods against snow, rain, dust and other weather or atmospheric conditions.

My invention has for its objects and purposes the provision for the rack having the utility and functions described which is readily manufactured economically, easily secured in place when used and quite as easily removed when its service is done, which is strong and durable in service and which, when not in use, occupies minimum space.

An understanding of the invention may be had from the following description, taken in connection with the accompanying drawings, in which, Fig. 1 is an end elevation of the rack in its place of use at the rear end of a station wagon body, the motor vehicle with such body and the rear door with which such rack is associated being shown in dash and dot lines.

Fig. 2 is an enlarged end elevation of the rack with parts broken away and shown in section for better disclosure of the structure.

Fig. 3 is a generally vertical section upon the plane of line 3—3 of Fig. 2 looking in the direction indicated.

Fig. 4 is a perspective view of the rack.

Fig. 5 is an enlarged fragmentary lower end elevation of the central vertical post of the rack showing its manner of detachable connection to the rear door of the station wagon body.

Fig. 6 is a horizontal section and plan view substantially on the plane of line 6—6 looking downwardly.

Fig. 7 is a rear elevation of the rack, and

Fig. 8 is a plan view of the rack showing the brace attachment in dash lines as when in use and showing them in full lines when not in use, collapsed to occupy minimum space.

Like reference characters refer to like parts in the different figures of the drawings.

The environment of the present invention and where it is used is at the rear end of a station wagon body of a motor vehicle. When used the rear closure door 1 of such body is turned to horizontal position having a hinge connection at its inner or lower portions to the body and held in horizontal position by the braces 2, one adjacent each end of the door also shown in dash and dot lines in Fig. 1.

In the structure of the rack, the rear member thereof which is vertically positioned when in use has a central preferably metallic post 3, shown as circular in cross section though not necessarily limited to such cross section. The post 3 is a solid post of substantaily the same diameter from its upper end to a short distance above its lower end, which post at its lower end portion is reduced in diameter to form a downward extension 4 which terminates at its lower end in an integral foot 5 of the form best shown in Figs. 5 and 6.

Spaced outwardly from the center posts 3 are end posts one at each end of the rack. Such end posts include each an intermediate somewhat elongated section 6, not as long as the upper portion of the center post 3 which may be of the same diameter as the center post 3. Two rod like extensions 7 and 8 integral with the center section 6 extend upwardly above and downwardly below the upper and lower ends of the center section 6, the lower extension 8 being somewhat longer than the upper extension 7. A collar 9 which may freely rotate on the upper extension 7 has above it a head or cap member 10 fixedly secured to the part 7 by a set screw or other equivalent fastening means.

Similarly at the lower end of each section 6 a collar 11 is passed upwardly on the lower extension 8 and below it a second collar 12 is fixedly secured by a set screw like the upper member 10. The extension 8 at its lower end portion is below the collar 12 and at such lower end has a foot member 13 of rubber or other like resilient material. Spaced horizontal rods 14 complete the rear member of the rack between the upper cap members 10 and the lower members 12 and the upper end of the center post 3, and between the sections 6 and such center post 3. The rods at their end portions are permanently secured by welding or other equivalent connecting means.

From the upper and lower collars 11 and 12 upper and lower end bars or rods 15 extend horizontally forward when in use, the upper rods 15 being of greater length than the lower rods 16. At the free ends of each of said rods an attaching member 17 is secured by welding or other permanent connections. Each member 17 has a vertical slot 18 from its lower end extending upwardly, located generally midway between the sides thereof (Fig. 4) and in the depending sides at each side of the slot 18 two grooves 19, one at each side of each slot, are cut substantially parallel to the lower ends of each attaching member 17.

By reason of the free rotation which may be given to the collars 9 and 11 the attaching rods may be swung or moved so that such rods 15 and 16 are at substantially right angles to the plane of the rear rack member bringing such attaching members to the braces 2 which are freely received in the slots 18 with their lower edges above the grooves. A plate 20 is slid into each groove 19 (Fig. 2). It carries a thumb screw 21 threaded therethrough, the end of which is tightened against the brace 2 with which associated. In this manner the rack is secured to the braces 2 with the rubber foot members 13 bearing against the upper side of the door near each rear corner thereof.

The member 5 lies against a metal plate 22 which is permanently secured at the inner side and near the outer edge of the door. Member 5 has a vertical opening which is adapted to receive an upwardly extending pin 23 carried by such metal plate 22. A holding clip 24 mounted at the upper side and inner edge portion of the plate 22 may be swung so that its free end is over the member 5 (Fig. 5) and then tightened thereagainst by the screw 25 which passes through the clip 24 and threads into the plate 22.

When thus assembled a sturdy and substantially rigid connection of the rack to such horizontal closure door 1 and the braces 2 which hold it in horizontal position is made. The rack insures that any package, luggage or other articles placed against the upper side of the door will be held in place and not fall off. A canvas or other fabric cover for the rack and all of the packages or other articles inside it is easily provided. The rotation of the collars 9 and 11 permit folding the braces against the rear member of the rack as shown in Fig. 8 or turning them outward to the position shown in the dash lines when the rack is to be used. Connection and disconnection of the rack to the rear door 1 and the carrying braces 2 therefor is quickly and easily accomplished. The invention is very practical and useful and may be manufactured and sold at relatively low cost.

The invention is defined in the appended claims and is to be considered comprehensive of all forms of structure coming within their scope.

I claim:

1. Structure as described comprising, two spaced vertical end posts, horizontal members secured to said posts at their ends permanently connecting said posts, an upper horizontal rod connected at its rear end to the upper portion of each end post extending forwardly generally at right angles to said members, a second rod, shorter than the first mentioned rod, connected at its rear end at the lower portion of each end post, also extending forward therefrom and located generally in the same vertical plane with the upper rod connected with its associated post, releasable attaching means secured at the forward end of each of said rods; each of said releasable attaching means comprising, a block at the forward, free end portion of its associated rod, said blocks each having a portion extending below its associated rod, each block having a vertical slot extending upwardly from the lower end of said portion and between the sides thereof, and a plate located across the lower portion of said slot means, slidably mounting said plate on said block for connection with and disconnection from said block, disconnection of which opens said slot, adapting said blocks to receive members in said slots for connection thereto.

2. Structure as described comprising two spaced, vertical end posts, an intermediate vertical post between the end posts, spaced horizontal rods permanently connecting said posts, upper and lower spaced rods, in generally the same vertical planes, connected at their rear ends to each of said end posts extending forwardly therefrom, the upper rod on each post being longer than the lower rod, releasable brace attaching means secured at the forward end of each of said rods, means at the lower end of the intermediate post for detachable connection to a generally horizontal support, and a foot member at the lower end of each end post adapted to bear against and rest upon said horizontal support.

3. The combination of a motor vehicle body having a rear closure door pivotally mounted at its lower edge to said body and extending generally horizontally rearwardly, said door having inclined forwardly and upwardly extending support braces connected at their ends to said door and body a rack having spaced vertical end posts and horizontal connecting members between them providing a vertical back of said rack, means for detachably securing said rack to said door, rods connected at rear ends thereof to said end posts, one at the upper and one at the lower portion of said end posts, said rods extending forward to said braces, and means for detachably connecting each rod at its forward end to an associated brace.

4. The combination of a motor vehicle body having a rear closure door pivotally mounted at its lower edge to said body and extending generally horizontally rearwardly, said door having inclined forwardly and upwardly extending support braces connected at their ends to said door and body, a rack having a rear vertical member located above and at the upper side of the rear portion of the open door extending substantially the length thereof, means for detachably connecting said rear vertical member to the door, members at each end of said first member extending forwardly therefrom to said braces, and means for detachably securing said last mentioned members at their forward ends to said braces.

References Cited in the file of this patent

UNITED STATES PATENTS

| 1,052,552 | Ackerman | Feb. 11, 1913 |
| 1,377,114 | Cardwell | May 3, 1921 |
| 1,813,458 | Meurer | July 7, 1931 |
| 2,497,597 | Gatewood | Feb. 14, 1950 |
| 2,554,776 | Comeau | May 29, 1951 |